R. MILNE.
LOCKING DEVICE FOR SHIFTABLE MEMBERS.
APPLICATION FILED MAY 20, 1910.
983,745.
Patented Feb. 7, 1911.
2 SHEETS—SHEET 1.
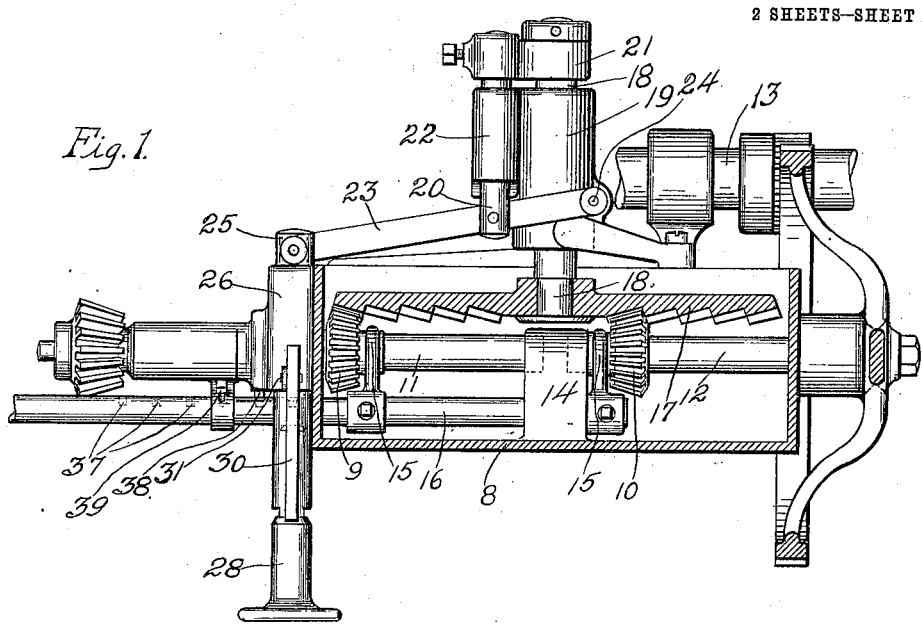
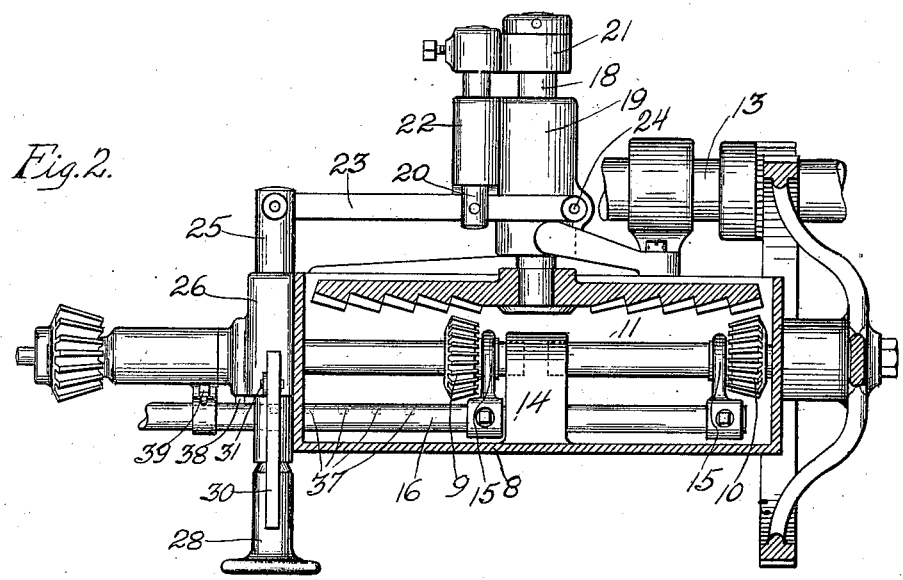
Witnesses:
Inventor:
Robert Milne.
By Banning & Banning
Attorneys.

R. MILNE.
LOCKING DEVICE FOR SHIFTABLE MEMBERS.
APPLICATION FILED MAY 20, 1910.
983,745.
Patented Feb. 7, 1911.
2 SHEETS—SHEET 2.
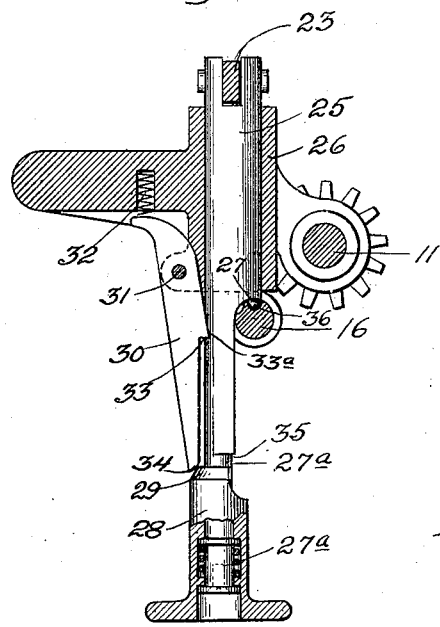
Fig. 3.
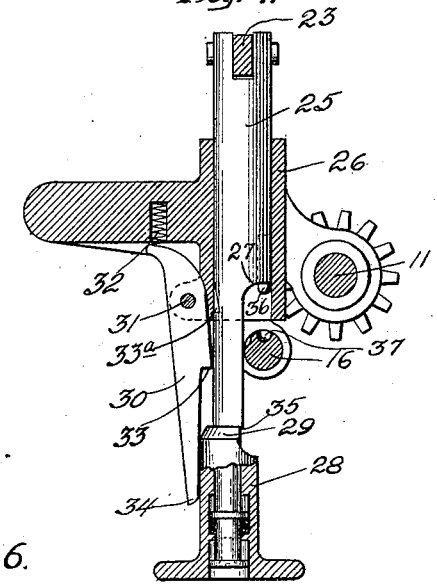
Fig. 4.
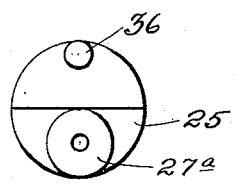
Fig. 5.
Fig. 6.
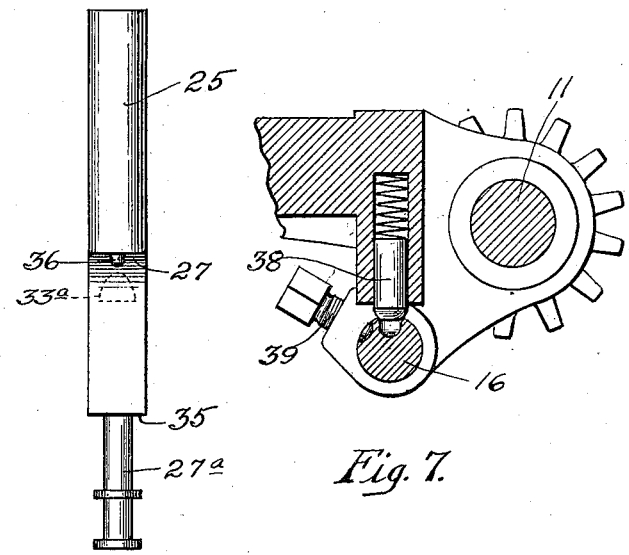
Fig. 7.
Witnesses:
Ephraim Banning
Wm P Bond
Inventor:
Robert Milne.
By Banning & Banning
Attorneys.

UNITED STATES PATENT OFFICE.

ROBERT MILNE, OF ROCKFORD, ILLINOIS, ASSIGNOR TO ROCKFORD DRILLING MACHINE COMPANY, OF ROCKFORD, ILLINOIS, A CORPORATION OF ILLINOIS.

LOCKING DEVICE FOR SHIFTABLE MEMBERS.

983,745.

Specification of Letters Patent.   Patented Feb. 7, 1911.

Application filed May 20, 1910.   Serial No. 562,455.

*To all whom it may concern:*

Be it known that I, ROBERT MILNE, a citizen of the United States, residing at Rockford, in the county of Winnebago, in the State of Illinois, have invented certain new and useful Improvements in Locking Devices for Shiftable Members, of which the following is a specification.

The present invention relates to means for governing and regulating the position of the driving and driven gears with regard to the variable speed gear connecting them, and is an improvement upon the regulating mechanism shown and described in Letters Patent No. 940,342 issued to me November 16, 1909.

While this device is shown as applied to the differential positive feed mechanism described and illustrated in my Patent No. 940,342, for the purpose of regulating the position of the driving and driven gears to the variable speed gear, it is understood that the device may be used with any form of mechanism where a shifting of mechanism is required which could be accomplished by such a regulator, and the form of mechanism herein shown and described is merely to show one application of the device.

The objects of the present invention are, to construct locking mechanism for positioning and holding the bar carrying the driving and driven gears in any desired position, and to provide a slidable knob which, upon an initial movement, will release a latch from engagement with said locking mechanism, and upon a further movement will move said locking mechanism out of locking engagement with said rod and simultaneously with such movement raise the variable speed gear connection free of the driving and driven gears, permitting the driving and driven gears to be moved to desired position.

A further object of the invention is to provide means whereby the operator may detect when the rod has been moved a sufficient distance to advance the driving and driven gears into their next successive position with respect to the variable speed gear.

The invention further relates to the features of construction and combination of parts hereinafter described and claimed.

In the drawings—Figure 1 is a sectional elevation showing the parts in locked or operative position; Fig. 2, a similar view showing the variable speed gear connection raised and the driving and driven gears shifted to another position; Fig. 3, a detail of the mechanism for locking the rod carrying the driving and driven gears and the latch mechanism in operative engagement with the locking mechanism; Fig. 4, a view similar to Fig. 3, showing the latch member released and the locking member moved out of locking position; Fig. 5, an end view of the rod carrying the locking member; Fig. 6, a plan view of said rod; and Fig. 7, a detail showing the indicator for determining when the rod has been moved a sufficient distance to shift the driving and driven gears to their next successive position.

The construction of the driving and driven gears and the variable speed connection between them, as well as their function and operation, has been fully described and shown in Letters Patent No. 940,342, granted to me and heretofore referred to, and detailed description thereof at this time is not deemed necessary. Describing said mechanism briefly, it is contained within a casing 8 and comprises a driving pinion 9 and a driven pinion 10, the driving pinion being connected to a shaft 11, which is operatively connected to the main power shaft, and the pinion 10 being connected to a shaft 12 which is operatively connected to a shaft 13 operating the mechanism for rotating the drill spindle.

The casing 8 is provided with a standard or bearing 14, into which is entered the adjacent ends of the shafts 11 and 12. The pinions 9 and 10 are carried by a yoke member 15, which is attached to and carried by a rod 16. The variable speed gear connection 17 is mounted upon a stub shaft 18, journaled within a sleeve 19, and the stub shaft 18 is moved up and down to raise the variable speed gear connection from the position shown in Fig. 1 to that shown in Fig. 2 by the movement of a rod 20 which is connected thereto by means of a collar 21, and the rod 20 is mounted within a sleeve 22 formed integral with the sleeve 19. Attached to the lower end of the rod 20 is a lever 23 pivoted at 24 and having its free end connected to a rod 25.

The mechanism hereinabove described is all shown and illustrated in my Patent No. 940,342, and the present invention does not reside in the construction or operation of said mechanism.

The present invention resides in the formation and method of operation of locking mechanism for controlling the movements of the rod 16, a detailed description of which is as follows: The rod 25, which is termed the locking member, is slidably mounted within a sleeve 26 and has its forward end cut away to provide a recess 27, in which lies and moves the rod 16. The rod 25 extends beyond the rod 16 and is further reduced at its extreme forward end to provide a stem 27ª, upon which is slidably mounted a knob 28. The knob 28 is held normally outwardly under spring tension and has its inner end formed with a beveled surface 29. Lying adjacent the rod 25 is a latch member 30, pivoted at 31, and having its forward end held normally toward the rod 25 by means of a spring 32. The latch 30 is provided with a locking shoulder 33, adapted to engage with a notch 33ª on the rod 25, and has its forward end 34 formed with a rounded surface thereon. The point of juncture between the stem 27ª and the body portion of the rod 25 forms a shoulder 35, against which the inner end of the knob 28 contacts when said knob is moved inward a sufficient distance, and at the juncture of the recess 27 with the body portion of the rod is formed a locking pin 36, which pin is adapted to enter recesses 37 formed in the rod 16 and lock the rod against movement in either direction.

Located adjacent to the rod 25 and in the line of travel of the recesses 37 is a spring controlled plunger 38, which serves as an indicator to determine when one of the notches 37 is in proper alinement for the pin 36 to enter thereinto. This indication is produced by the click incident to the entering of the plunger 38 into one of the recesses. The plunger as shown is formed with a bevel and so that it rides easily in and out of the recesses.

The rod 16 is withheld from rotation by means of a set-screw 39, or other suitable and well known device.

The operation is as follows: Upon the initial movement of the knob 28, the beveled end 29 thereof will engage the rounded end 34 of the latch member 30 and lift the latch member sufficient to withdraw the locking shoulder 33 from engagement with the notch 33ª in the rod 25. Then, upon a further movement of the knob 28, the end thereof will be brought into engagement with the shoulder 35, whereby a further movement of the knob will cause the rod 25 and the knob 28 to move simultaneously, thus withdrawing the pin 36 from engagement with the recess 37 into which it is entered and at the same time moving said locking member inward, thus, in the construction shown, lifting the variable speed gear connection through the medium of the arm 23 and the rods 20 and 18, the variable speed gear being free of the gears 9 and 10. The rod 16, carrying said gears, can then be moved in the direction desired to bring the driving gear 9 and the driven gear 10 into desired relation with the variable speed gear. The recesses 37 are spaced a distance upon the rods equal to the distance necessary to move the driving and driven gears to move them to their next successive position with respect to the variable speed gear. Hence when the rod 16 has been moved a distance equal to the distance between one of the recesses 37 and the next adjacent recess the indicator 38 will click, thus notifying the operator that the driving and driven gears are in their next successive position with regard to the variable speed gear, and the indicator is so positioned with respect to the rod 25 that when one of the recesses 37 is in register therewith the adjacent recess toward the rod 25 will be in register with the pin 36, so that when the locking member is returned to normal position the pin 36 will enter the selected recess 37 and lock the rod.

I claim:

1. In combination with a shiftable member having a plurality of recesses therein, a slidably mounted locking member, a latch member for holding the locking member in position for locking the shiftable member, a member slidably mounted on the locking member and adapted on its initial movement to release the latch member from engagement with the locking member and upon a further movement to release the locking member from the shiftable member, substantially as described.

2. In combination with a shiftable member having a plurality of recesses therein, a slidably mounted locking member, a latch member for holding the locking member in position for locking the shiftable member, a member slidably mounted on the locking member and adapted on its initial movement to release the latch member from engagement with the locking member and upon a further movement to release the locking member from the shiftable member, and an indicator for determining when the recesses in the shiftable member are in alinement with the locking portion of the locking member, substantially as described.

3. In combination with a shiftable member having a plurality of recesses therein, a slidably mounted locking member, a latch member for holding the locking member in position for locking the shiftable member, a knob slidably mounted on the locking member, said knob having a beveled end which on the initial movement of the knob raises the latch member from engagement with the locking member, said knob upon a further movement engaging the slidable member whereby said slidable member is moved in unison with said knob to release the locking member from the shiftable member, substantially as described.

4. In combination with a shiftable member having a plurality of recesses therein, a slidably mounted locking member, a latch member for holding the locking member in position for locking the shiftable member, a knob slidably mounted on the locking member, said knob having a beveled end which on the initial movement of the knob raises the latch member from engagement with the locking member, said knob upon a further movement engaging the slidable member whereby said slidable member is moved in unison with said knob to release the locking member from the shiftable member, and an indicator for determining when the recesses in the shiftable member are in alinement with the locking portion of the locking member, substantially as described.

5. In combination with a shiftable member having a plurality of recesses therein, a slidably mounted locking member carrying a locking pin, a latch member for holding the locking member in position for locking the shiftable member, a knob slidable mounted on the locking member, said knob having a beveled end which on the initial movement of the knob raises the latch member from engagement with the locking member, said locking member being provided with a shoulder adapted to be engaged by the end of the knob upon a further movement thereof whereby after such engagement said knob and locking member are moved in unison to release the locking member from the shiftable member, substantially as described.

6. In combination with a shiftable member having a plurality of recesses therein, a slidably mounted locking member carrying a locking pin, a latch member for holding the locking member in position for locking the shiftable member, a knob slidably mounted on the locking member, said knob having a beveled end which on the initial movement of the knob raises the latch member from engagement with the locking member, said locking member having a shoulder adapted to be engaged by the end of the knob upon a further movement thereof whereby after such engagement said knob and locking member are moved in unison to release the locking member from the shiftable member, and an indicator for determining when the recesses in the shiftable member are in alinement with the locking pin of the locking member, substantially as described.

7. In combination with a shiftable member having a plurality of recesses therein, a slidably mounted locking member carrying a locking pin, a latch member for holding the locking member in position for locking the shiftable member, said locking member having a recess therein in which said shiftable member lies and moves, a knob slidably mounted on the locking member, the end of said locking member being reduced to provide a stem on which said knob is mounted, said knob having a beveled end which on the initial movement of the knob raises the latch member from engagement with the locking member, said knob engaging the slidable member upon a further movement thereof whereby said slidable member is moved in unison with said knob to release the locking member from the shiftable member, substantially as described.

8. In combination with a shiftable member having a plurality of recesses therein, a slidably mounted locking member carrying a locking pin, a latch member for holding the locking member in position for locking the shiftable member, said locking member having a recess therein in which said shiftable member lies and moves, a knob slidably mounted on the locking member, the end of said locking member being reduced to provide a stem on which said knob is mounted, said knob having a beveled end which on the initial movement of the knob raises the latch member from enagement with the locking member, said knob engaging the slidable member upon a further movement thereof whereby said slidable member is moved in unison with said knob to release the locking member from the shiftable member, and an indicator for determining when the recesses in the shiftable member are in alinement with the locking pin of the locking member, substantially as described.

9. In combination with a shiftable member having a plurality of recesses therein, a slidably mounted locking member carrying a locking pin, a latch member for holding the locking member in position for locking the shiftable member, a knob slidably mounted on the locking member, said locking member having its outer portion cut away to provide a recess in which said shiftable member lies and moves, the end of said cut-away portion being reduced to provide a stem on which said knob is mounted, the juncture of the stem and cut-away portion providing a shoulder on said locking member adapted to be contacted by the end of the knob whereby after such contact said knob and locking member are moved in unison releasing said locking member from engagement with the shiftable member, said knob upon its initial movement releasing the latch member from engagement with the locking member, substantially as described.

10. In combination with a shiftable member having a plurality of recesses therein, a slidably mounted locking member carrying a locking pin, a latch member for holding the locking member in position for locking the shiftable member, a knob slidably mounted on the locking member, said locking member having its outer portion cut away to provide a recess in which said shiftable member lies and moves, the end of said cut-away portion being reduced to provide a stem on which said knob is mounted, the juncture of the stem and cut-away portion providing a shoulder on said locking member adapted to be contacted by the end of the knob whereby after such contact said knob and locking member are moved in unison releasing said locking member from engagement with the shiftable member, said knob upon its initial movement releasing the latch member from engagement with the locking member, and an indicator for determining when the recesses in the shiftable member are in alinement with the locking pin of the locking member, substantially as described.

11. In combination with a shiftable member having a plurality of recesses therein, a slidably mounted locking member carrying a locking pin, a latch member for holding the locking member in position for locking the shiftable member, a knob slidably mounted on the locking member, said locking member having its outer portion cut away to provide a recess in which said shiftable member lies and moves, the end of said cut-away portion being reduced to provide a stem on which said knob is mounted, the juncture of the stem and cut-away portion providing a shoulder on said locking member adapted to be contacted by the end of the knob whereby after such contact said knob and locking member are moved in unison releasing said locking member from engagement with the shiftable member, said knob upon its initial movement releasing the latch member from engagement with the locking member, and a spring controlled pin engaging said shiftable member at the line of recesses therein and serving as an indicator for determining when the recesses in said shiftable member are in alinement with said locking pin, substantially as described.

ROBERT MILNE.

Witnesses:
WM. P. BOND,
FRANCES M. FROST.